US012609048B2

(12) United States Patent
Endo

(10) Patent No.: US 12,609,048 B2
(45) Date of Patent: Apr. 21, 2026

(54) DRIVING DIAGNOSTIC DEVICE, DRIVING DIAGNOSTIC SYSTEM, MACHINE LEARNING DEVICE AND GENERATION METHOD OF LEARNED MODEL

(71) Applicant: TOYOTA JIDOSHA KABUSHIKI KAISHA, Aichi-ken (JP)

(72) Inventor: Masato Endo, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 461 days.

(21) Appl. No.: 18/298,388

(22) Filed: Apr. 11, 2023

(65) Prior Publication Data

US 2023/0401979 A1 Dec. 14, 2023

(30) Foreign Application Priority Data

Jun. 13, 2022 (JP) ................................ 2022-095243

(51) Int. Cl.
*G09B 19/16* (2006.01)
*G06N 20/20* (2019.01)
(52) U.S. Cl.
CPC ........... *G09B 19/167* (2013.01); *G06N 20/20* (2019.01)
(58) Field of Classification Search
CPC ........ G09B 19/167; G09B 9/04; G09B 9/042; G09B 9/05; G09B 9/052; B60W 50/08; B60W 50/12; B60W 50/14; B60W 50/16; B60W 2050/143; B60W 2050/146; B60W 60/00253
See application file for complete search history.

(56) References Cited

U.S. PATENT DOCUMENTS

2002/0091473 A1* 7/2002 Gardner ............... G07C 5/0808
701/32.7
2019/0291739 A1 9/2019 Komizo
2020/0079383 A1 3/2020 Shiga et al.
2020/0312172 A1* 10/2020 Rönnäng ................. G06N 5/04

FOREIGN PATENT DOCUMENTS

| JP | 2000-065592 A | 3/2000 |
| JP | 2006-214945 A | 8/2006 |
| JP | 2010-231776 A | 10/2010 |
| JP | 5587465 B2 | 9/2014 |
| JP | 2018-101321 A | 6/2018 |
| JP | 2019-174861 A | 10/2019 |
| JP | 2020-42642 A | 3/2020 |
| JP | 2022-133105 A | 9/2022 |

\* cited by examiner

*Primary Examiner* — Kang Hu
*Assistant Examiner* — Correll T French
(74) *Attorney, Agent, or Firm* — HAUPTMAN HAM, LLP

(57) ABSTRACT

The driving diagnostic device of the present disclosure includes: an acquisition unit that acquires traveling data indicating a traveling state of a vehicle; a driving evaluation unit that evaluates a driving operation of the driver based on the traveling data acquired by the acquisition unit; a passenger presence-absence detection unit that detects presence or absence of a passenger in the vehicle; and a notification unit that notifies a driver of a driving evaluation result detected by the driving evaluation unit, wherein the notification unit changes a notification method of the driving evaluation result based on a detection result of the passenger presence-absence detection unit.

9 Claims, 8 Drawing Sheets

FIG. 4

| EVALUATION ITEMS | WARNING NUMBER |
|---|---|
| SUDDEN ACCELERATION | 5 |
| SUDDEN BRAKING | 7 |
| SUDDEN STEERING | 5 |
| LANE DEVIATION | 3 |
| WAKIMI OPERATION | 3 |
| INSUFFICIENT DISTANCE BETWEEN VEHICLES | 7 |
| INDICATOR OPERATION FAILURE | 5 |

FIG. 5

| EVALUATION ITEMS | WARNING NUMBER |
|---|---|
| SUDDEN BRAKING | 7 |
| SUDDEN STEERING | 5 |
| LANE DEVIATION | 3 |
| WAKIMI OPERATION | 3 |

DRIVING DIAGNOSTIC DEVICE, DRIVING DIAGNOSTIC SYSTEM, MACHINE LEARNING DEVICE AND GENERATION METHOD OF LEARNED MODEL

CROSS-REFERENCE TO RELATED APPLICATION

This application claims priority to Japanese Patent Application No. 2022-095243 filed on Jun. 13, 2022, incorporated herein by reference in its entirety.

BACKGROUND

1. Technical Field

The present disclosure relates to a driving diagnostic device, a driving diagnostic system, a machine learning device, and a generation method of a learned model.

2. Description of Related Art

Conventionally, whether a driving operation of a specific vehicle corresponds to a dangerous driving or a driving that deteriorates fuel efficiency has been diagnosed. Further, the driver of the vehicle is notified of the result of the driving diagnostics.

For example, Japanese Unexamined Patent Application Publication No. 2010-231776 (JP 2010-231776 A) describes a device capable of informing a driver of a tendency of a driving operation by acquiring traveling data indicating a traveling state of a vehicle, evaluating the traveling data acquired based on a predetermined diagnostic item, determining the tendency of the driving operation by the driver, and notifying the driver of the tendency.

SUMMARY

The driving diagnostics as described in JP 2010-231776 A can be expected to have a certain effect to improve the driving quality of the driver. The driving diagnostics as described above can also be applied to a passenger transportation vehicle for carrying passengers. The passenger transportation vehicle is a private vehicle, and further, a taxi, a bus, and a vehicle that provides ride sharing service. Hereinafter, the above vehicles are collectively referred to as "business vehicles" or simply "vehicles". When the driving quality of the driver is improved by performing the driving diagnostics of the business vehicle, the quality of the passenger transportation service can be improved.

The result of the driving diagnostics described above is generally notified sequentially to the driver via a speaker or a monitor mounted on a vehicle or the like. Such a notification method is preferable because it is possible to transmit the driving diagnostic result to the driver in a timely and reliable manner when the passenger is not on board the business vehicle. Hereinafter, a state in which a passenger is not on board a business vehicle is also referred to as an "empty vehicle". However, when the driver is notified of the result of the driving diagnostics by the above-described method while the passenger is on board the business vehicle, the driving diagnostic result can possibly be transmitted to the passenger. Hereinafter, a state in which the passenger is on board the business vehicle is also referred to as an "actual vehicle". Since the information of the driving diagnostic result is unnecessary information for the passenger, the notification may deteriorate the comfort of the passenger (riding comfort). Further, depending on the contents of the driving diagnostic result, there is a possibility that the driver's driving skills may be worried and the credibility of the driver of the passenger may be impaired.

An object of the present disclosure is to provide a driving diagnostic device, a driving diagnostic system, a machine learning device, and a generation method of a learned model in consideration of the presence or absence of a passenger in a vehicle.

In order to achieve the above object, a driving diagnostic device according to claim 1 of the present disclosure includes: an acquisition unit that acquires traveling data indicating a traveling state of the vehicle; a driving evaluation unit that evaluates a driving operation of a driver of the vehicle based on the traveling data acquired by the acquisition unit; a passenger presence-absence detection unit that detects a presence or absence of a passenger in the vehicle; and a notification unit that notifies the driver of a driving evaluation result detected by the driving evaluation unit and changes a notification method of the driving evaluation result based on a detection result of the passenger presence-absence detection unit.

In the driving diagnostic device according to claim 1, the notification method of the driving evaluation result is changed based on the presence or absence of the passenger in the vehicle. Therefore, the driving diagnostic device according to claim 1 of the present disclosure can adopt a notification method in consideration of the presence or absence of a passenger in the vehicle.

In the driving diagnostic device according to claim 2 of the present disclosure, in the driving diagnostic device according to claim 1, the driving evaluation unit evaluates the driving operation of the driver based on the number of times that the traveling data acquired by the acquisition unit corresponds to conditions of a plurality of evaluation items related to a preset driving operation, and evaluates the driving operation of the driver using a first evaluation item group used when the passenger presence-absence detection unit detects the absence of the passenger and a second evaluation item group that is used when the passenger presence-absence detection unit detects the presence of the passenger and is different from the first evaluation item group.

In the driving diagnostic device according to claim 2, when the driving operation is evaluated, the evaluation is performed using two different evaluation item groups based on the presence or absence of the passenger. Therefore, it is possible to evaluate the driving operation of the driver with higher accuracy.

In the driving diagnostic device according to claim 3 of the present disclosure, in the driving diagnostic device according to claim 1 or 2, the notification unit does not notify the driving evaluation result when the passenger presence-absence detection unit detects the presence of the passenger.

In the driving diagnostic device according to claim 3, the driving evaluation result is not notified when the passenger is on board. Therefore, the driving evaluation result is not transmitted to the passenger, and this can suppress hindering of the comfortable movement of the passenger, or unnecessary impairing of the trust of the driver of the passenger.

In the driving diagnostic device according to claim 4 of the present disclosure, in the driving diagnostic device according to any one of claims 1 to 3, the passenger presence-absence detection unit includes an inference unit that estimates the presence or absence of the passenger from the traveling data; and the inference unit outputs an estimation result of the presence or absence of the passenger by inputting the traveling data to an input layer of a learned model in which machine learning for estimating the presence or absence of the passenger is performed.

In the driving diagnostic device according to claim 4, the presence or absence of the passenger can be estimated by the inference unit. This eliminates the need for various types of devices, installation operations, and the like for detecting the presence or absence of a passenger.

A driving diagnostic system according to claim 5 of the present disclosure is a driving diagnostic system provided with a server and a terminal device installed in a vehicle, the server and the terminal device being connected so as to be communicable with each other via a network, and includes: an acquisition unit that acquires traveling data indicating a traveling state of the vehicle; a driving evaluation unit that evaluates a driving operation of a driver of the vehicle based on the traveling data acquired by the acquisition unit; a passenger presence-absence detection unit that detects a presence or absence of a passenger in the vehicle; and a notification unit that is provided in the terminal device, notifies the driver of a driving evaluation result by the driving evaluation unit, and changes a notification method of the driving evaluation result based on a detection result of the passenger presence-absence detection unit.

The driving diagnostic system according to claim 5 changes the notification method of the driving evaluation result based on the presence or absence of the passenger in the vehicle. Therefore, the driving diagnostic system according to claim 5 can adopt a notification method in consideration of the presence or absence of the passenger in the vehicle.

A machine learning device according to claim 6 of the present disclosure is a machine learning device for acquiring a learned model to be used in the inference unit of the driving diagnostic device according to claim 4, and includes: a learning dataset acquisition unit that acquires two or more learning datasets, each of which is composed of input data including the traveling data indicating the traveling state of the vehicle and output data including data indicating the presence or absence of the passenger in the vehicle; and a learning processing unit that learns a learning model for estimating a correlation between the input data and the output data using the two or more learning datasets acquired by the learning dataset acquisition unit.

In the machine learning device according to claim 6, it is possible to obtain a learned model capable of estimating the presence or absence of the passenger in the vehicle from the traveling data of the vehicle.

A generation method of a learned model according to claim 7 of the present disclosure is a generation method of a learned model to be used in the inference unit of the driving diagnostic device according to claim 4, and includes: a step of acquiring two or more learning datasets, each of which is composed of input data including the traveling data indicating the traveling state of the vehicle and output data including data indicating the presence or absence of the passenger in the vehicle; and a step of learning a learning model for estimating a correlation between the input data and the output data using the two or more learning datasets.

In the generation method of a learned model according to claim 7, it is possible to generate a learned model capable of estimating the presence or absence of the passenger in the vehicle from the traveling data of the vehicle.

According to the present disclosure, it is possible to provide the driving diagnostic device, the driving diagnostic system, the machine learning device, and the generation method of a learned model in consideration of the presence or absence of the passenger in the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a diagram illustrating an example of a first evaluation item group of the driving evaluation unit illustrated in FIG. 3;

FIG. 5 is a diagram illustrating an example of a second evaluation item group of the driving evaluation unit illustrated in FIG. 3;

DETAILED DESCRIPTION OF EMBODIMENTS

Hereinafter, embodiments of the present disclosure will be described with reference to the drawings. It is to be noted that a range necessary for the explanation for achieving the object of the present disclosure will be schematically shown below, and a range necessary for the explanation of the corresponding part of the present disclosure will be mainly described, and a part for which the explanation is omitted will be based on a known technique.

First Embodiment

Figure 1:
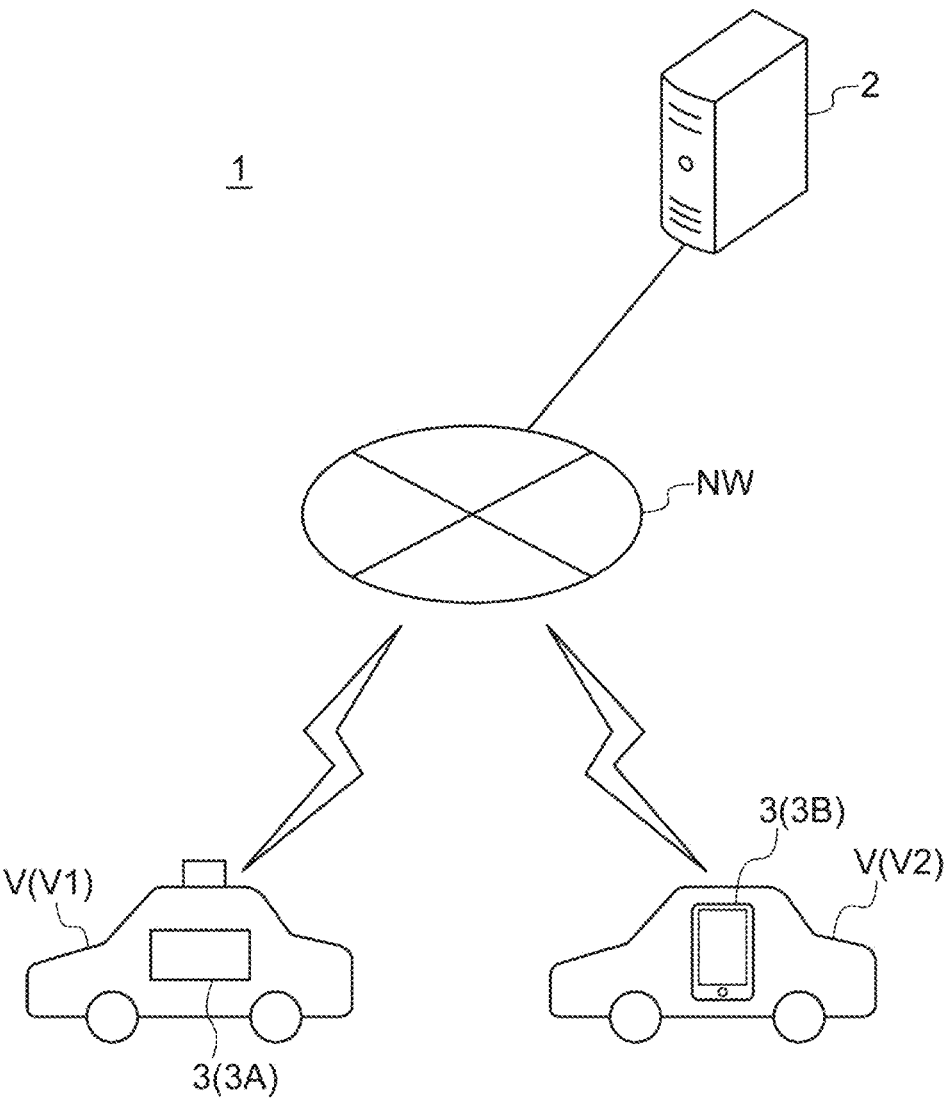
FIG. 1 is a schematic diagram illustrating an overall configuration of an example of a driving diagnostic system according to a first embodiment.

FIG. 1 is a schematic diagram illustrating an overall configuration of an example of a driving diagnostic system according to a first embodiment of the present disclosure. As illustrated in FIG. 1, the driving diagnostic system 1 according to the first embodiment includes at least a server 2 and a terminal device 3 installed in a vehicle (business vehicle) V. The server 2 and the terminal devices 3 are communicably connected to each other via a networked NW. In FIG. 1, one taxi V1 and one ride sharing service providing vehicle V2 are illustrated as the vehicle V, but the vehicle V is not limited thereto, and may be another passenger transportation vehicle such as a bus.

The server 2 can be constituted by a server computer held by an administrator of the vehicle V. Specifically, the server 2 may be a server held by a taxi company that manages a plurality of taxi V1, or a server held by a company that provides a ride sharing service included in the terminal device 3 installed in the ride sharing service providing vehicle V2.

A well-known computer can be used as the server 2. Known computers may include at least a processor, a memory, and a communication interface. The server 2 may be capable of performing operation management of the vehicle V, for example. In addition, the server 2 may be capable of receiving various kinds of information of the vehicle V, for example, position information and information on the presence or absence of a passenger, from the terminal device 3, and transmitting a dispatch instruction or the like to each terminal device 3. Furthermore, the server 2 may be capable of executing a part of the operation diagnostic processing described later.

The terminal device 3 can be configured by a device installed in the vehicle V. Specifically, the mobile communication terminal 3B may be configured by an on-board device 3A mounted on a vehicle V (e.g., a taxi V1) or a mobile communication terminal installed in a vehicle V (e.g., a ride sharing service providing vehicle V2) when the driver operates the vehicle. As the mobile communication terminal 3B, an information terminal having a communication function such as a smart phone, a tablet terminal, or a mobile-type personal computer can be employed. In the present embodiment, the terminal device 3 functions as the driving diagnostic device 10.

Figure 2:
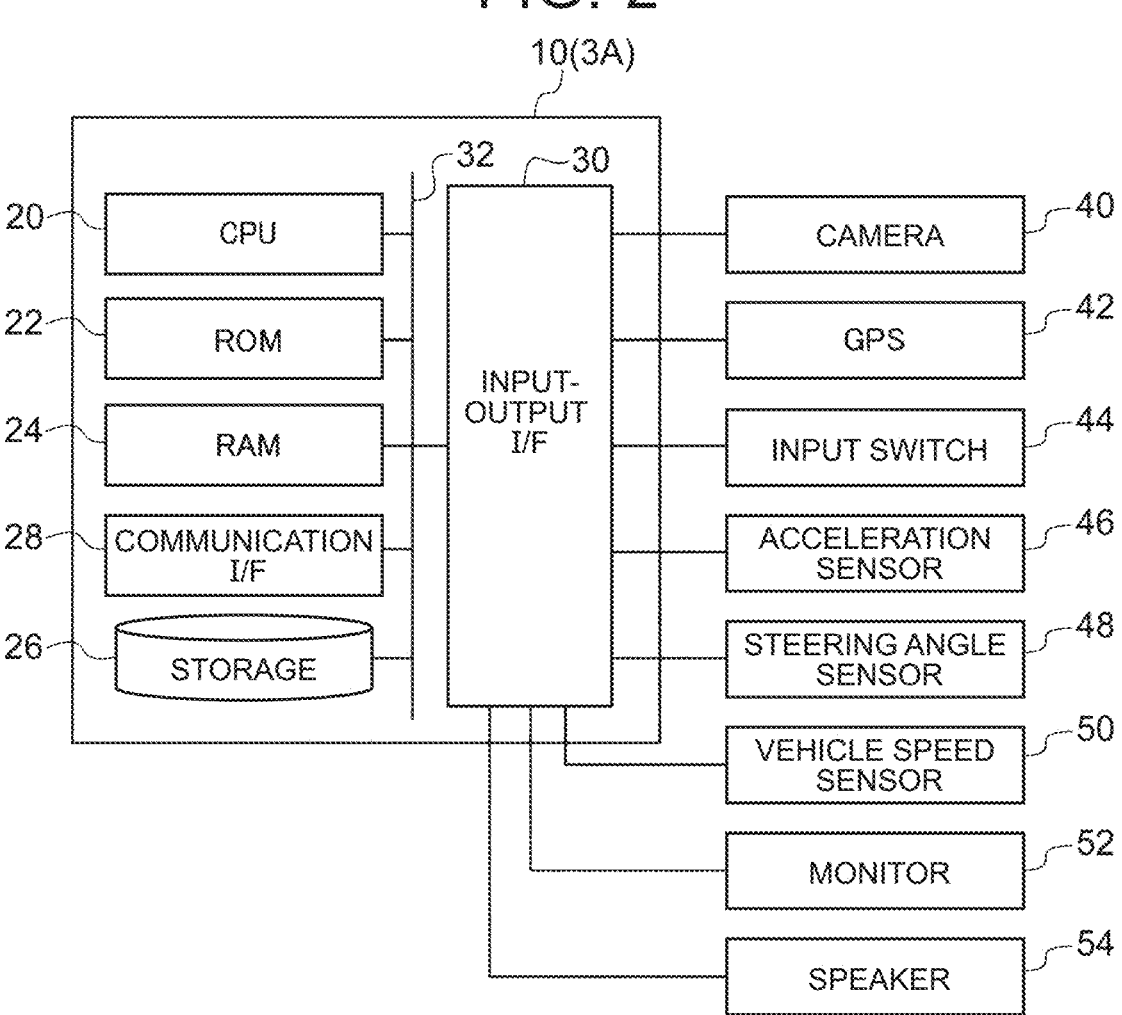
FIG. 2 is a block diagram illustrating a hardware configuration of an example of the driving diagnostic device according to the first embodiment.

FIG. 2 is a block diagram illustrating a hardware configuration of an example of the driving diagnostic device according to the first embodiment of the present disclosure. FIG. 2 illustrates an example in which the driving diagnostic device 10 is realized by an on-board device 3A mounted on a taxi V1. As illustrated in FIG. 2, the driving diagnostic device 10 according to the present embodiment can be realized by a computer. Specifically, the driving diagnostic device 10 may include a Central Processing Unit (CPU)20 as an example of a processor, a Read Only Memory(ROM) 22 and a Random Access Memory(RAM)24 as an example of a memory, a storage 26, a communication interface 28, and an input/output interface 30. These configurations may be communicably connected to each other via the internal bus 32.

CPU 20 may be a central processing unit capable of executing various programs and controlling each unit. Specifically, CPU 20 may be capable of reading out various programs stored in ROM 22 or the storage 26 and executing the programs using RAM 24 as a working area. CPU 20 may be capable of controlling the constituent elements of the driving diagnostic device 10 and performing various arithmetic processes in accordance with the programming.

ROM 22 may be capable of storing various programs and various data. In addition, RAM 24 may be capable of temporarily storing programs/data as a working area.

The storage 26 may be configured by a recording medium such as Hard Disk Drive (HDD) or Solid State Drive(SSD), and may be configured to store various programs including an operating system and various types of data required for operating the driving diagnostic device 10. In the present embodiment, ROM 22 or the storage 26 may store programs and various types of data for performing a driving diagnostic process.

The communication interface 28 may be an interface capable of performing radio communication for the driving diagnostic device 10 to communicate with the server 2 and other devices via a networked NW. In the communication interface 28, a communication standard such as Controller Area Network (CAN), Ethernet (Long Term Evolution (LTE), Fiber Distributed Data Interface (FDDI, or Wi-Fi (registered trademark) may be used.

The input/output interface 30 may be an interface for transmitting and receiving data and the like to and from various components mounted on the vehicle V or the terminal device 3 and the like, which are necessary for performing the driving diagnostic process. The constituent elements electrically connected to the input/output interface 30 may be appropriately selected according to the contents of the driving diagnostics and the like. In the present embodiment, as the input/output interface 30, as shown in FIG. 2, several components provided in the vehicle V, specifically, a camera 40, a Global Positioning System (GPS)42, an input switch 44, an acceleration sensor 46, a steering angle sensor 48, a vehicle speed sensor 50, a monitor 52, and a speaker 54 are electrically connected to each other. The input/output interfaces 30 and the above-described various constituent elements may be directly connected to each other or may be connected to each other via an Electronic Control Unit (ECU for controlling each constituent element.

The camera 40 can be constituted by an imaging unit capable of imaging the outside of the vehicle V or the inside of the vehicle cabin. A well-known image sensor such as a Charge Coupled Device (CCD) or Complementary Metal Oxide Semiconductor (CMOS) image sensor can be used as the camera 40. The camera 40 may include one or a plurality of external cameras installed outside the vehicle V and capable of capturing an image of the surroundings of the vehicle V, for example, the front of the vehicle, and one or a plurality of internal cameras installed in a vehicle cabin of the vehicle V and directed toward the driver or the rear seat so as to capture an image of the situation inside the vehicle. External cameras can be used to recognize inter-vehicle distances, lanes and traffic lights with preceding vehicles traveling in front of the vehicle. In addition, the internal camera can be used to detect the line-of-sight direction of the driver and the presence or absence of a passenger.

GPS 42 may be a device mounted on the vehicle V and capable of measuring the present position of the vehicle V. GPS 42 may include an antenna-not shown-for receiving signals from GPS satellites.

The input switch 44 may be provided at a position operable by a driver, for example, an instrument panel, a center console, a steering wheel, or the like, and may be used to realize various operations related to the driving diagnostic device 10. The switch 44 can be constituted by a push button switch, a touch panel, or the like. The input switch 44 may include a switch related to a driving operation of the vehicle V, for example, a switch for turning on a winker or a hazard lamp, a switch for operating a horn, or a switch related to an operation of a taxi V1, for example, a switch for a driver to switch an actual vehicle/an empty vehicle of the vehicle V, an opening/closing lever of a rear door, or the like. When the driving diagnostic device 10 is applied to the mobile communication terminal 3B, a touch panel or the like for operating an application (for example, an application related to a ride sharing service) or the like on the portable communication terminal 3B may also be included.

The acceleration sensor 46 may be a sensor capable of detecting acceleration in any direction of the vehicle V, for example, three directions of front and rear, left and right, and up and down. The steering angle sensor 48 may be a sensor capable of detecting a steering angle of the vehicle V, more specifically, a steering angle of a steering wheel of the vehicle V. Further, the vehicle speed sensor 50 may be a sensor capable of detecting the vehicle speed of the vehicle V. As for these three sensors, a sensor having a well-known structure can be adopted, and therefore a detailed description thereof will be omitted.

The data of the acceleration detected by the acceleration sensor 46 can be used, for example, to determine the presence or absence of sudden acceleration/deceleration (specifically, sudden acceleration or sudden braking) of the vehicle V. Further, the steering angle data detected by the steering angle sensor 48 can be used, for example, to determine the presence or absence of sudden steering or U-turn. Further, the vehicle speed data detected by the vehicle speed sensor 50 can be used, for example, to determine whether or not there is a sudden acceleration/deceleration of the vehicle V, a legal speed, or an overspeed of the limit speed.

The monitor 52 may be provided at a position visible to a driver in a front portion of the vehicle cabin, such as an instrument panel or a meter panel, and may be configured by a display capable of displaying various information. The monitor 52 may be a liquid crystal panel, an organic EL panel, or the like. In addition, a display having a touch panel function may be adopted as a center display as an example of the monitor 52 provided in the instrument panel.

The speaker 54 may be provided at an appropriate position in the vehicle cabin, for example, a dashboard, a front door, or the like, and may be capable of outputting sound to the driver. The speaker 54 and the monitor 52 described above can function as a notification unit 66 (see FIG. 3) that notifies the driver of the diagnostic result of the driving diagnostic device 10.

Figure 3:
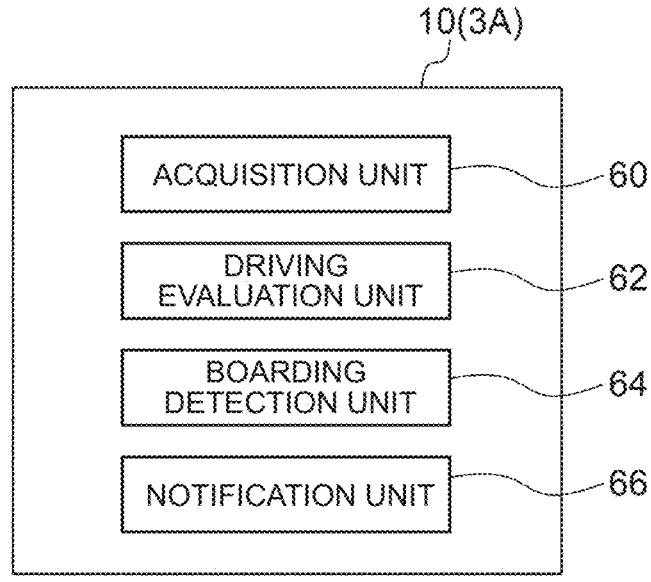
FIG. 3 is a block diagram illustrating a functional configuration of an example of the driving diagnostic device according to the first embodiment.

FIG. 3 is a block diagram illustrating a functional configuration of an example of the driving diagnostic device according to the first embodiment of the present disclosure. The driving diagnostic device 10 according to the present embodiment can realize various functions by using the above-described hardware resources. Specifically, as shown in FIG. 3, the driving diagnostic device 10 includes at least an acquisition unit 60 that acquires traveling data indicating the traveling state of the vehicle V, a driving evaluation unit 62 that evaluates the driving operation of the driver, a passenger presence-absence detection unit 64 that detects the presence or absence of a passenger in the vehicle V, and a notification unit 66 that notifies the driver of the driving evaluation result by the driving evaluation unit 62.

The acquisition unit 60 is for acquiring traveling data indicating a travel state of the vehicle V. The acquisition unit 60 can be realized mainly by the above-described input/output interface 30. The traveling data acquired by the acquisition unit 60 may include various types of data of the vehicle V during travel. Specifically, the traveling data may include, for example, at least part of image data captured by the camera 40, position information data acquired by GPS 42, operation data of the input switch 44, and output signal data of various sensors (the acceleration sensor 46, the steering angle sensor 48, and the vehicle speed sensor 50).

The driving evaluation unit 62 is for evaluating the driving operation of the driver based on the traveling data acquired by the acquisition unit 60. The driving evaluation unit 62 can be realized mainly by the above-described CPU 20. The evaluation of the driving operation may in particular be an evaluation of whether or not the driver is performing a dangerous driving or a driving that deteriorates fuel efficiency, or whether or not there is a risk of such driving. Specifically, it is possible to detect that the traveling data acquired by the acquisition unit 60 corresponds to a condition of a plurality of evaluation items related to a preset driving operation, and evaluate the driving operation of the driver based on the detected number of times. Hereinafter, a plurality of evaluation items related to a preset driving operation is also referred to as an "evaluation item group".

FIG. 4 is a diagram illustrating an example of an evaluation item group (first evaluation item group) used in the driving evaluation unit illustrated in FIG. 3. Some evaluation items (evaluation item group) used in the driving evaluation unit 62 according to the present embodiment can be identified based on data that can be acquired via the input/output interface 30. In other words, the evaluation item group used in the driving evaluation unit 62 is appropriately set among the items that can be evaluated by the data that can be acquired via the input/output interface 30. As an example of evaluation items constituting the evaluation item group, for example, as shown in FIG. 4, sudden acceleration, sudden braking, sudden steering, lane protrusion, squeak driving, insufficient distance between cars, and imperfection of a winker operation can be exemplified. Specifically, the winker operation deficiency is a winker operation delay or a right-left turn without a winker operation. Note that the above-described evaluation items are merely examples, and some of these evaluation items may not be adopted even if other evaluation items are included. Incidentally, as the evaluation items other than the above-mentioned evaluation items, for example, an excess of the legal speed or the limit speed, a protrusion of the stop line, a pause violation, and the like are exemplified.

When evaluating each of the evaluation items constituting the above-described evaluation item group, the evaluation may be performed as follows. That is, the rapid acceleration and the rapid braking can be evaluated based on a signal from the acceleration sensor 46 or the vehicle speed sensor 50. Rapid steering can be evaluated based on signals from the steering angle sensor 48. The lane protrusion and the lack of inter-vehicle distance can be evaluated on the basis of an image of the front of the vehicle captured by the camera 40, in particular, the external camera. The brute-sight driving can be evaluated on the basis of an image captured by an internal camera, which is directed in particular to the driver of the camera 40. The blinker operating deficiencies can then be evaluated on the basis of a switch for operating the winker, in particular of the input switch 44, and also on the basis of position data from GPS 42 or from the steering angle sensor 48.

In addition, the evaluation of the above-described evaluation items can be performed using, for example, any threshold value. Specifically, for example, the evaluation regarding the sudden acceleration and the sudden braking can be evaluated based on the number of times the signal indicating that the acceleration or the deceleration is performed at the acceleration sensor 46 equal to or higher than a preset threshold value is detected. In the present embodiment, it is assumed that a warning is given to the driver via the notification unit 66 when the number of times the acceleration sensor 46 detects that a signal indicating that the acceleration or deceleration is performed at or above the threshold value exceeds a predetermined number of times (hereinafter, also referred to as a "warning number"). The number of warnings may be set for each evaluation item, and may be adjusted according to the contents of the evaluation item, for example, as shown in FIG. 4. The result of the evaluation by the driving evaluation unit 62 may be transmitted to the server 2 via the communication interface 28. The evaluation result transmitted to the server 2 can be used for operation management or the like of the driver.

The passenger presence-absence detection unit 64 is for detecting the presence or absence of a passenger in the vehicle V. Although a specific method for detecting the presence or absence of a passenger is not particularly limited, in the present embodiment, a case is exemplified in which the presence or absence of a passenger is detected by using directly detectable information among the information input via the input/output interface 30. More specifically, the presence or absence of the passenger can be detected based on, for example, an input operation of the input switch 44 by the driver. Specifically, the input switch 44 is a switch for switching between an actual vehicle and an empty vehicle for the taxi V1 business. In addition, as a method of detecting the presence or absence of a passenger according to the present embodiment, there is a method of detecting the presence or absence of a passenger based on, for example, an imaging result of an internal camera capable of imaging a rear seat of the camera 40 or based on a detection result of a pressure sensor (not shown) provided in advance on a seat of the rear seat, in addition to the method of detecting the presence or absence of a passenger by the input switch 44 described above.

The notification unit 66 is for notifying the driver of the driving evaluation result by the driving evaluation unit 62. The notification unit 66 can be realized mainly by at least one of the monitor 52 and the speaker 54 described above. Various methods can be adopted as the method of notifying the driving evaluation result by the notification unit 66. For example, the total evaluation of the driving operation may be displayed on the monitor 52 by a score or a message. Alternatively, an advice or warning message related to the evaluation result may be displayed. A message, a warning sound, or the like corresponding to the driving evaluation result may be output from the speaker 54.

Here, when the notification unit 66 notifies the driver of the driving evaluation result, as described above, it is possible to use the audio output by the speaker 54, the message display on the monitor 52, and the like. However, performing the notification when the passenger is on the vehicle V may transmit unnecessary information to the passenger, and thus may hinder the comfortable movement of the passenger. In particular, when the evaluation item evaluated by the driving evaluation unit 62 reaches the specified number of warnings (hereinafter, referred to as "warning notification") is transmitted to the passenger, the driver's driving operation is anxious. This may unnecessarily reduce the reliability of the driver.

In consideration of the above-described points, the notification unit 66 according to the present embodiment changes the notification method based on the detection result of the passenger presence-absence detection unit 64 when notifying the driver of the driving evaluation result. Then, by changing the notification method, the driving diagnostics in consideration of the situation inside the vehicle is performed. More specifically, by changing the notification method so that the contents of the driving diagnostic result are not transmitted to the passenger, the driving diagnostics is performed without hindering the comfortable movement of the passenger.

In the present embodiment, the notification method of the driving evaluation result by the notification unit 66 when the passenger is not on board may be such that the notification content can be clearly understood. Specifically, for example, the above-described audio output by the speaker 54 and message display on the monitor 52 may be used alone or in combination. On the other hand, the method of notifying the driving evaluation result by the notification unit 66 when the passenger is not on board may be such that the notification content cannot be understood by itself, or the notification unit 66 may not notify the driver when the passenger is on board.

As a method of notifying the driving evaluation result by the notification unit 66, a method in which the notification content cannot be understood by itself is to perform, for example, only an icon display on the monitor 52, a simple symbol mark (for example, an exclamation mark), or the like. Further, in the case where the notification unit 66 does not notify the driver, the warning notification that should be notified by the notification unit 66 may be stored at least temporarily in the storage area of the storage 26 or the server 2, and the notification may be made again at a timing when the passenger is not on the vehicle, or may be made to be in a state of being browsable at an arbitrary timing. Note that the notification method of the driving evaluation result by the notification unit 66 considering the presence or absence of the passenger is not limited to the above-described one, and can be appropriately changed within a range in which the purpose can be achieved.

As described above, if the method of the notification of the driving diagnostic result by the notification unit 66 is changed according to the presence or absence of the passenger, a notification method considering the presence or absence of the passenger can be adopted. In particular, if a method in which the notification content is not transmitted to the passenger is adopted as a notification method when the passenger is on board, for example, the passenger on the vehicle V is substantially prevented from recognizing the notification of the driving diagnostic result. Therefore, the notification does not hinder the comfortable movement of the passenger. Further, since the driving diagnostics itself can be performed regardless of the presence or absence of the passenger, the driver can improve the driving technique and the quality of the passenger transportation service based on the driving diagnostic result.

Incidentally, in a business vehicle, driving in response to a request of a passenger is often performed in a real vehicle. For example, when the passenger is in a hurry, the driver may perform driving with the vehicle speed and acceleration higher than normal. In addition, when driving is performed along the route guidance of the passenger, it is assumed that a sudden lane change or a right and left turn occurs due to a delay in the guidance of the passenger. In addition, a driver of a business vehicle tends to perform comfortable driving in an actual vehicle. On the contrary, it is known that a driver of a business vehicle tends to drive more carelessly in an empty vehicle than in an actual vehicle. Therefore, the driving operation in the business vehicle may be greatly changed depending on whether the vehicle is in an actual vehicle state or an empty vehicle state.

In view of the above, in the driving diagnostic device 10 according to the present embodiment, in addition to changing the notification method by the notification unit 66 based on the presence or absence of a passenger, the evaluation method of the driving evaluation unit 62 may be changed based on the presence or absence of a passenger. Specifically, as will be described below, for example, the evaluation items to be evaluated in the driving evaluation unit 62 may be changed based on the presence or absence of a passenger, thereby realizing the driving evaluation corresponding to the actual vehicle/empty vehicle state.

FIG. 5 is a diagram illustrating an example of a second evaluation item group of the driving evaluation unit illustrated in FIG. 3. The driving evaluation unit 62 according to the present embodiment may perform the driving evaluation considering the presence or absence of the passenger by making the evaluation item group (hereinafter referred to as "first evaluation item group") to be evaluated when the passenger is not on board and the evaluation item group (hereinafter referred to as "second evaluation item group") to be evaluated when the passenger is on board different from each other. In the following description, the evaluation item group described above with reference to FIG. 4 is an example of the first evaluation item group.

As shown in FIGS. 4 and 5, the type and number of the evaluation items may be different between the first evaluation item group and the second evaluation item group. As a specific example, the first evaluation item group is composed of seven items: sudden acceleration, sudden braking, sudden steering, lane protrusion, foreground driving, lack of inter-vehicle distance, and lack of winker operation. On the other hand, the second evaluation item group may include four items of sudden braking, sudden steering, lane protrusion, and forward-looking driving. In the above example, the second evaluation item group does not include three evaluation items of rapid acceleration, insufficient inter-vehicle distance, and insufficient turn-in-car operation. These evaluation items are because it is possible to assume that the driver intentionally performs these operations when the passenger is in a hurry or when a sudden right-to-left turn instruction is issued from the passenger.

As described above, by switching and evaluating the two evaluation item groups in the driving evaluation unit 62, the driving diagnostic result according to the driver's own driving tendency is obtained without reflecting the intentional sudden acceleration, the winker operation deficiency, or the like caused by the passenger's instruction in the driving diagnostic result. Note that the contents of the evaluation items constituting the first and second evaluation item groups described above are merely examples. The evaluation items constituting each evaluation item group can be changed as appropriate. Further, in the present embodiment, an example is shown in which the evaluation items are changed based on the presence or absence of a passenger. However, the number of warnings set may be changed instead of or in addition to changing the evaluation items.

In the above-described embodiment, a case has been illustrated in which the terminal device 3 constituting the driving diagnostic device 10 includes the respective components necessary for realizing the driving diagnostic processing described below. However, a part of these components may be included in the server 2, so that the driving diagnostic process may be realized as the entire driving diagnostic system 1. Specifically, at least a part of the driving evaluation unit 62, the passenger presence-absence detection unit 64, or the acquisition unit 60 may be provided in the server 2. For example, in a case where the driving evaluation unit 62 is provided in the server 2, various types of traveling data acquired by the acquisition unit 60 are sequentially transmitted to the server 2 via the communication interface 28. Then, the driving evaluation unit 62 in the server 2 performs the driving evaluation of the vehicle V on the basis of the traveling data transmitted from the terminal device 3, and returns the result to the terminal device 3 at an arbitrary timing.

Next, an example of the operation diagnostic process performed by the driving diagnostic device 10 including the above-described series of configurations will be briefly described. The driving diagnostic process described below may be performed by CPU 20 executing a program stored in ROM 22 or the storage 26.

Figure 6:
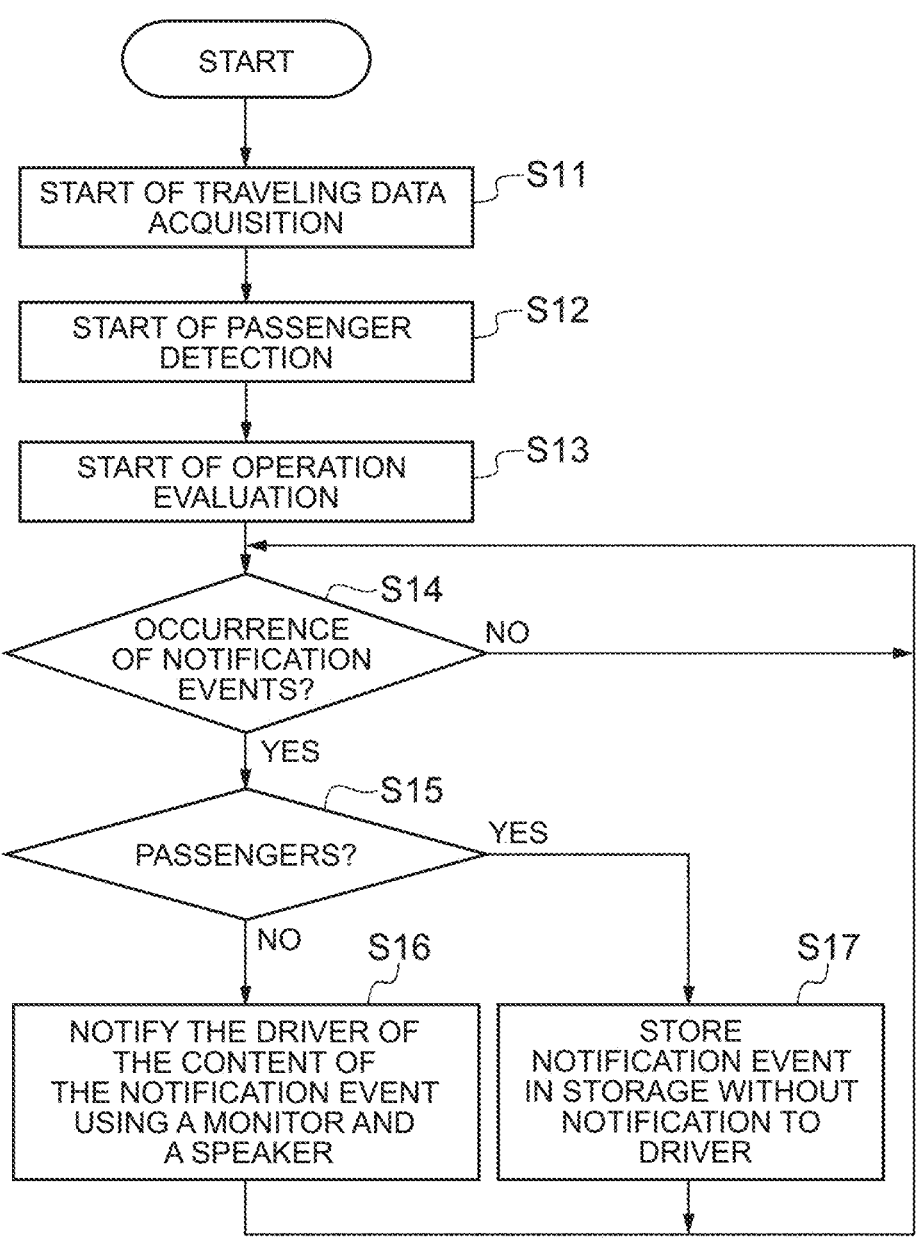
FIG. 6 is a flowchart illustrating an example of a driving diagnostic process performed by the driving diagnostic device according to the first embodiment of the present disclosure.

FIG. 6 is a flowchart illustrating an example of a driving diagnostic process performed by the driving diagnostic device according to the first embodiment of the present disclosure. The operation diagnostic process by the driving diagnostic device 10 according to the present embodiment can be realized by performing the steps generally shown in FIG. 6. Specifically, when the operation of the vehicle V, specifically, the taxi V1 is started by operating the ignition switch or the like, the traveling data is started to be acquired (step S11). As illustrated in FIG. 2, the traveling data can be acquired by acquiring signals from various sensors and the like mounted on the vehicle V via the input/output interface 30.

After the above-described step S11 or at the same timing as the step S11, the passenger presence-absence detection unit 64 starts detecting the presence/absence of the passenger (step S12), and the driving evaluation unit 62 also starts evaluating the operation (step S13). As the passenger presence-absence detection unit 64, a unit that determines the presence or absence of a passenger based on the presence or absence of an input signal from the input switch 44 may be adopted. Further, the driving evaluation unit 62 may be configured to count the number of times exceeding a threshold value set in each of a plurality of evaluation items set in advance, and perform the driving evaluation based on whether or not the number of times exceeds a predetermined number of warnings. In addition, the driving evaluation unit 62 may perform evaluation by switching the above-described first and second evaluation item groups based on the detection result of the passenger presence-absence detection unit 64. Note that the relative starting timings of the above-described steps S11 to S13 are not limited to the above-described timings.

When the operation of the taxi V1 is started, the acquisition of the traveling data by the acquisition unit 60 is continuously executed, and the operation is evaluated based on the acquired traveling data. In parallel with this, the presence or absence of a passenger is continuously detected. Then, when an event to be notified to the driver (hereinafter referred to as a "notification event") occurs as a result of the driving assessment (Yes in the step S14), the notification unit 66 identifies a notification event notification method. The notification event may include, for example, a warning notification performed when the number of warnings set for each of the evaluation items illustrated in FIG. 4 or FIG. 5 is exceeded.

In the step S14, when the occurrence of the notification event is detected, it is checked whether the detection by the passenger presence-absence detection unit 64 is the passenger presence or absence (step S15). Then, when it is detected that the passenger is not on the vehicle, the notification unit 66 performs notification to the driver in such a manner that the content of the generated notification event can be clearly understood (step S16). Specifically, the notification unit 66 may perform notification to the driver by using both the message display to the monitor 52 and the audio output from the speaker 54. As the message display in this case, for example, a message such as "refrain from rapid acceleration" can be adopted. As the audio output, for example, the above-described message may be output by voice. By performing such notification, the driver can recognize the diagnostic result of the driver's own driving in a timely manner.

When the step S15 confirms that the passenger is on the vehicle, the notification unit 66 does not notify the driver to avoid the notification event that has occurred from being transmitted to the passenger (step S17). Here, the notification event that has not been notified to the driver may be stored at least temporarily in the storage 26. Temporarily stored notification events may allow the driver to view the content at appropriate timing, such as when a passenger is not on board, or may be notified again. Upon completion of the step S16 and S17, the driving diagnostic device 10 returns to the step S14 to continue monitoring for new notification events.

As described above, according to the driving diagnostic device 10 or the driving diagnostic system 1 according to the present embodiment, the notification method of the driving diagnostic result is changed according to the presence or absence of the passenger, so that the notification of the driving diagnostics according to the situation in the vehicle can be performed. Further, as described above, if the driving diagnostic result is not transmitted to the passenger when the passenger is not on board, it is possible to improve the driving operation of the driver while suppressing the deterioration in the quality of the passenger transportation service. Therefore, both the improvement of the passenger's comfort and the suppression of the accident can be expected to be effective.

Second Embodiment

In the on-board device 3A, it is relatively easy to acquire signals of various sensors provided in the vehicle V. Therefore, as in the first embodiment described above, when the driving diagnostic device 10 is realized by the on-board unit 3A mounted on the taxi V1, the presence or absence of a passenger can be detected easily and with high accuracy. On the other hand, in some embodiments of the driving diagnostic device, it is not easy to acquire various kinds of data necessary for the driving diagnostics described above. For example, when the driving diagnostic device is implemented in the form of an application in the mobile communication terminal 3B, in order to detect the presence or absence of a passenger, the mobile communication terminal 3B may acquire imaging data of a camera 40 (particularly, an inner camera) provided in the vehicle V, or acquire information on an actual vehicle/an empty vehicle operated by a driver or the like in an application of the ride sharing service. This may require considerable effort in setting up to allow for the installation of devices and the exchange of data between applications. In addition, it is not realistic to request such an operation, since it is a hindrance to the transportation business to allow the driver to input the information on the actual vehicle/empty vehicle only for the driving diagnostics. Therefore, it is preferable that a series of processes including the detection of the presence or absence of a passenger can be realized by the driving diagnostic device alone without using the operation information of various components mounted on the vehicle V or the operation information of other applications and without requesting the driver to perform an input operation, so that the installation work and the setting work of the device can be simplified.

Therefore, as a second embodiment of the present disclosure, a driving diagnostic device 10A capable of detecting the presence or absence of a passenger with high accuracy without taking into consideration the data acquired exclusively for the detection will be described below. Hereinafter, the driving diagnostic device 10A will be exemplarily realized by the mobile communication terminal 3B installed in the ride sharing service providing vehicle V2 in the driving diagnostic system 1 illustrated in FIG. 1. However, as described above, the mobile communication terminal 3B is a terminal device capable of adapting the driving diagnostic device 10 according to the first embodiment described above, and is not limited to the aspects described below. Similarly, the driving diagnostic device 10A according to the present embodiment can also be realized by an on-board device 3A mounted on a taxi V1.

The driving diagnostic device 10A according to the present embodiment may have a configuration similar to that of the driving diagnostic device 10 according to the first embodiment. Therefore, a configuration different from that of the driving diagnostic device 10 according to the first embodiment will be mainly described below, and the same reference numerals will be given to the same structures as those of the driving diagnostic device 10 according to the first embodiment described above, and description thereof will be omitted. Further, in the driving diagnostic device 10A described below, as in the driving diagnostic device 10 according to the first embodiment, a part of the components may be included in the server 2, so that the driving diagnostic process may be realized as the driving diagnostic system.

Figure 7:
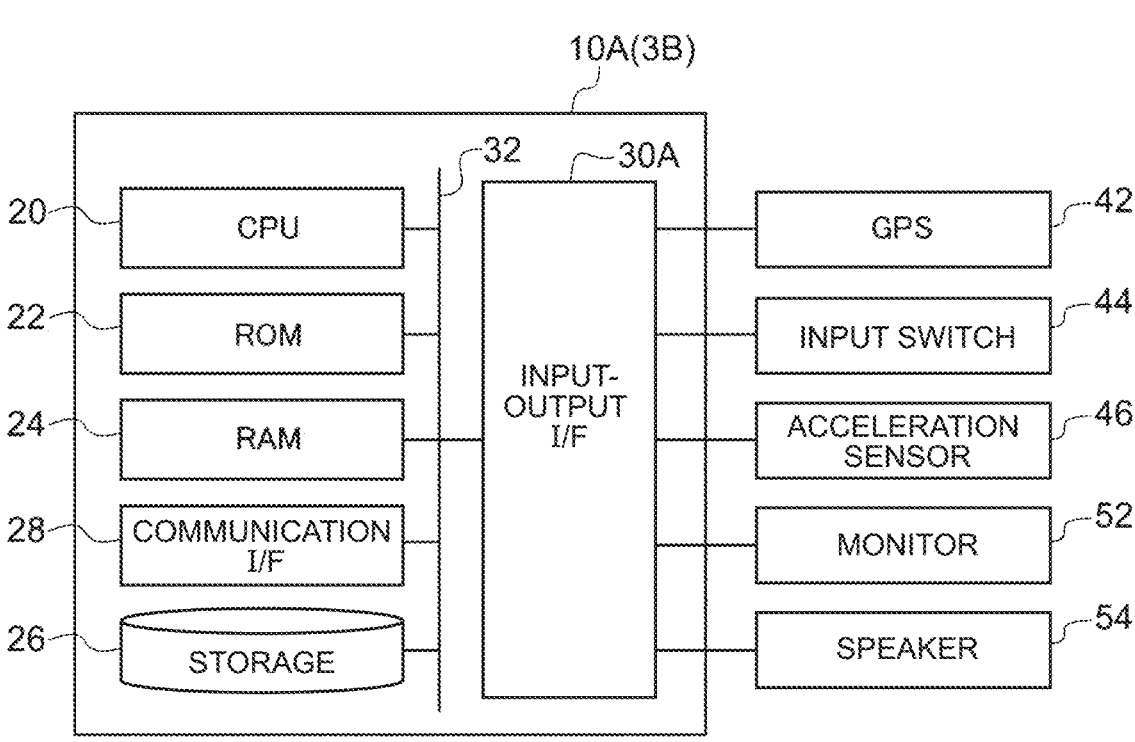
FIG. 7 is a block diagram illustrating a hardware configuration of an example of the driving diagnostic device according to the second embodiment.

FIG. 7 is a block diagram illustrating a hardware configuration of an example of a driving diagnostic device according to a second embodiment of the present disclosure. The driving diagnostic device 10A according to the present embodiment can be applied to, for example, a mobile communication terminal 3B provided in the ride sharing service providing vehicle V2 shown in FIG. 1. As shown in FIG. 7, the hardware configuration of the driving diagnostic device 10A may include a CPU 20 as an example of a processor, a ROM 22 and a RAM 24 as an example of a memory, a storage 26, a communication interface 28, and an input/output interface 30A, similarly to the driving diagnostic device 10 according to the first embodiment described above.

The input/output interface 30A of the present embodiment may be an interface for transmitting and receiving data and the like to and from various components in the mobile communication terminal 3B required for performing the driving diagnostic process. That is, the input/output interface 30A of the present embodiment may not be electrically connected to the vehicles V. As a component electrically connected to the input/output interface 30A, for example, as shown in FIG. 7, a GPS 42, an input switch 44, an acceleration sensor 46, a monitor 52, and a speaker 54 may be electrically connected.

Figure 8:
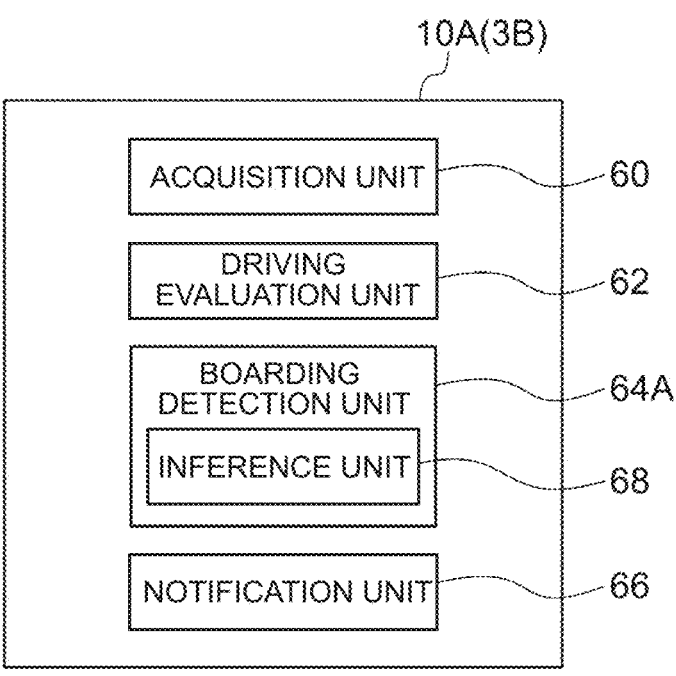
FIG. 8 is a block diagram illustrating a functional configuration of an example of the driving diagnostic device according to the second embodiment.

FIG. 8 is a block diagram illustrating a functional configuration of an example of a driving diagnostic device according to a second embodiment of the present disclosure. The driving diagnostic device 10A according to the present embodiment can realize various functions by using the above-described hardware resources. Specifically, as illustrated in FIG. 8, the driving diagnostic device 10A includes an acquisition unit 60 that acquires traveling data indicating a traveling state of the vehicle V, a driving evaluation unit 62 that evaluates a driving operation of the driver, a passenger presence-absence detection unit 64A that detects the presence or absence of a passenger in the vehicle V, and a notification unit 66 that notifies the driver of the driving evaluation result by the driving evaluation unit.

The acquisition unit 60, the driving evaluation unit 62, and the notification unit 66 described above may have substantially the same functions as those of the driving diagnostic device 10 according to the first embodiment. On the other hand, the passenger presence-absence detection unit 64A of the driving diagnostic device 10A according to the present embodiment may further include an inference unit 68 that estimates the presence/absence of the passenger in the vehicle V from the traveling data acquired by the acquisition unit 60. That is, the passenger presence-absence detection unit 64A of the driving diagnostic device 10A according to the present embodiment attempts to specify the presence/absence of the passenger by estimating the presence/absence of the passenger using the inference unit 68 instead of referring to a signal or the like directly indicating the presence of the passenger.

The inference unit 68 may estimate the presence or absence of a passenger by using a learned model obtained by using machine learning. Here, the learned model can be constituted by a model in which machine learning is performed so that the presence or absence of a passenger can be estimated from the traveling data. For example, an inference model learned using various machine learning techniques such as a neural network model, a decision tree model, and a support vector machine may be employed. Then, when the traveling data acquired by the acquisition unit 60 is input to the input layer of the learning model, an estimation result of the presence or absence of the passenger may be obtained.

The learned model used in the inference unit 68 can be acquired by using the machine learning device 70. Therefore, a machine learning device 70 for acquiring the above-described learned model and a method for generating the learned model will be described below.

Figure 9:
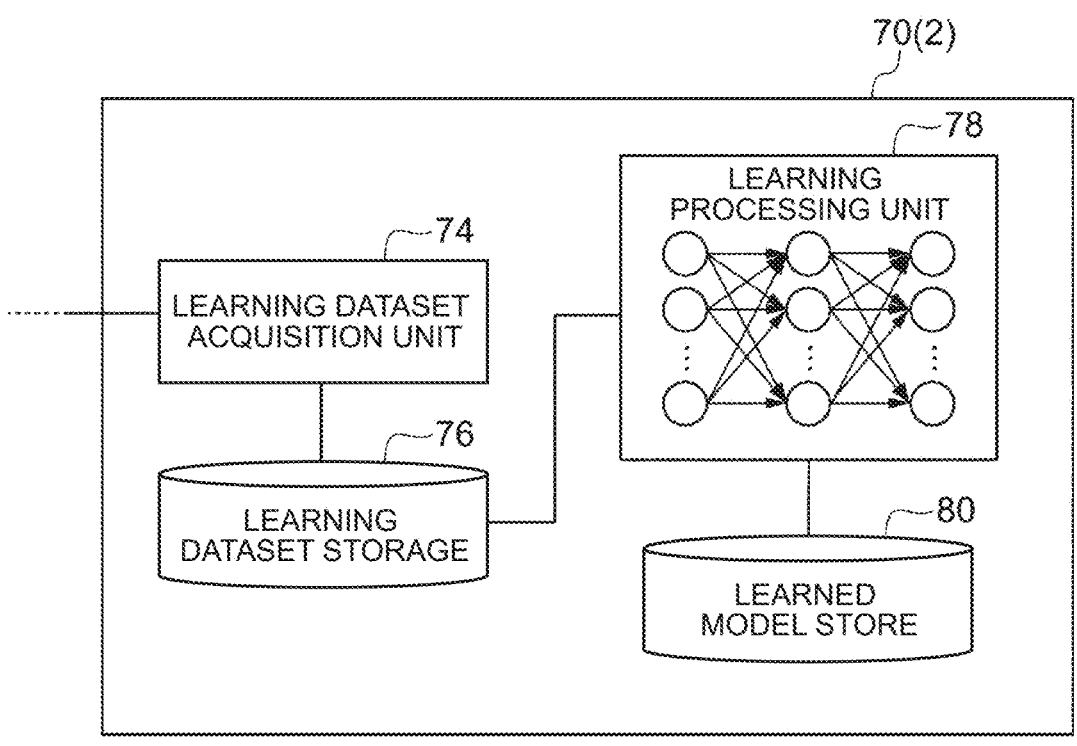
FIG. 9 is a block diagram illustrating a functional configuration of an example of the machine learning device according to the second embodiment.

FIG. 9 is a block diagram illustrating a functional configuration of an example of the machine learning device according to the second embodiment of the present disclosure. The machine learning device 70 according to the present embodiment may be implemented by the server 2. As illustrated in FIG. 9, the machine learning device 70 may include a learning dataset acquisition unit 74, a learning dataset storage unit 76, a learning processing unit 78, and a learned model storage unit 80. Although the server 2 implements the machine learning device 70 in the present embodiment, the machine learning device 70 may be implemented by the terminal device 3. In this case, it is possible to realize the generation of the learned model by the terminal device 3 alone and the estimation of the presence or absence of the passenger using the learned model.

The learning dataset acquisition unit 74 is connectable to the driving diagnostic device 10A via, for example, a networked NW. The learning dataset acquisition unit 74 acquires a plurality of pieces of data constituting a learning (training) dataset transmitted from the terminal device 3 via the communication interface of the server 2. The learning dataset may be a dataset composed of input data (sometimes referred to as an "explanatory variable") including traveling data indicating a traveling state of the vehicle V and output data (sometimes referred to as an "objective variable") including data indicating the presence or absence of a passenger in the vehicle V. Therefore, the data acquired by the learning dataset acquisition unit 74 may include at least two pieces of traveling data acquired by the acquisition unit 60 of the driving diagnostic device 10A and data indicating the presence or absence of the passenger at that time. The traveling data may be data acquired by the acquisition unit

60 of the driving diagnostic device 10A, specifically, position data determined by GPS 42 and the output signal of the acceleration sensor 46 during any given time interval. However, the traveling data is not limited thereto as long as it is data related to the travel of the vehicle V that can be acquired by the acquisition unit 60. Further, the data indicating the presence or absence of a passenger constituting one learning dataset may be one value (that is, a value corresponding to either "present" or "not present").

The traveling data acquired by the learning dataset acquisition unit 74 and the data indicating the presence or absence of the passenger may be associated with each other as one learning dataset in advance or after the learning dataset acquisition unit 74 acquires the data. A plurality of sets of such data may be generated for each vehicle V or for each driver.

The learning dataset storage unit 76 may be a recording medium such as a database for storing various types of data acquired by the learning dataset acquisition unit 74 in units of learning datasets for each vehicle V or for each driver. Note that the learning dataset storage unit 76 can be omitted. In this case, the learning dataset acquired by the learning dataset acquisition unit 74 may be sequentially sent to the learning processing unit 78.

The learning processing unit 78 is for causing a learning model to be learned using a plurality of sets of learning datasets stored in the learning dataset storage unit 76 to generate a learned model. In the present embodiment, supervised learning using a neural network is adopted as a specific method of machine learning as described below. As described above, the specific method of machine learning is not limited to this. Other learning methods can be employed as long as the correlation between the input and output can be learned from the learning dataset.

As illustrated in FIG. 9, the neural network model learned by the learning processing unit 78 may include one to a plurality of neurons constituting an input layer to which input data is input, one to a plurality of neurons constituting an output layer, a plurality of neurons constituting an intermediate layer provided between the input layer and the output layer, and a node connecting each neuron. The number of neurons constituting the input layer and the output layer may be adjusted to the number of data of the input data and the output data. The number of layers of the intermediate layer (sometimes referred to as "hidden layer") may be one as illustrated in FIG. 9, but may be set to two or more. In addition, any weight value may be associated with a node stretched between neurons constituting each layer. The learning processing unit 78 can generate a learned model by learning the neural network model having the above-described configuration using the learning dataset. A specific method of generating the learned model will be described later.

The learned model storage unit 80 may be a database for storing the learned model generated by the learning processing unit 78. The learned model stored in the learned model storage unit 80 is applied to an actual system, that is, any driving diagnostic device 10A, in response to a request from an administrator of the vehicle V or the like. In FIG. 9, for convenience of explanation, the learning dataset storage unit 76 and the learned model storage unit 80 are illustrated as separate storage means, but these may be configured by a single recording medium (database). The learned model storage unit 80 can also be omitted in the same manner as the learning dataset storage unit 76. In such cases, the learned models learned and generated by the learning processing unit 78 may be sequentially transmitted to the corresponding driving diagnostic device 10A.

Next, a method of generating a learned model used in the passenger presence-absence detection unit 64A according to the present embodiment will be described. In the following description, a method of generating a learned model by executing supervised learning using the above-described machine learning device 70 using a learning dataset (sometimes referred to as teacher data) will be exemplified. In this regard, the following explanation of effects and the like also serves as an explanation of effects of the machine learning device 70 according to the present embodiment. It should be noted that the method of generating the learned model of the present disclosure may be implemented by any computer, and is not limited to that by the machine learning device 70. Further, the method for generating a learning model according to the present embodiment may be provided in the form of a program that causes a processor of a computer to execute a predetermined operation, or in the form of a non-volatile computer-readable medium storing the program.

Figure 10:
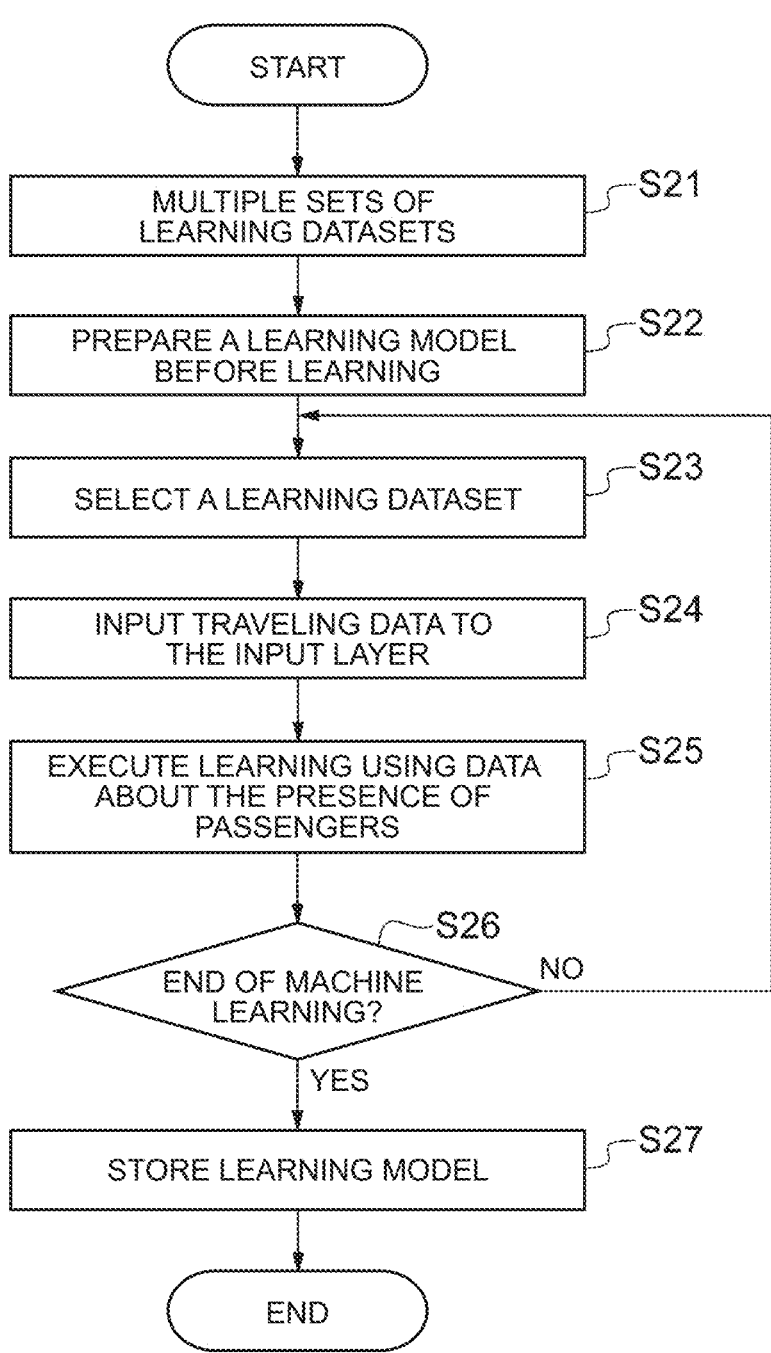
FIG. 10 is a flowchart illustrating an example of a method for generating a learned model according to the second embodiment.

FIG. 10 is a flowchart illustrating an example of a method for generating a learned model according to the second embodiment of the present disclosure. At the time of generating the learned model, first, a plurality of sets of learning datasets used for learning are acquired by the learning dataset acquisition unit 74 (step S21). As described above, the learning dataset acquired here may be composed of input data composed of traveling data indicating a traveling condition of an arbitrary vehicle V (for example, the ride sharing service providing vehicle V2 illustrated in FIG. 1) and output data composed of data indicating the presence or absence of a passenger in the vehicle V. The number of learning datasets acquired in the step S21 may be determined based on, for example, a number that is assumed to be required to generate a learned model capable of obtaining an inference with a desired accuracy. The learning dataset acquired here may be stored in the learning dataset storage unit 76.

Next, a learning model for performing learning is prepared (step S22). The learning model prepared here may be a model before learning is performed, for example, a neural network model in which a weight value set in each node is set to an arbitrary initial value.

When the preparation of the learning model for acquiring and learning the learning dataset used for the learning is completed, the learning processing unit 78 performs the learning next. The process performed here may be a process of learning a learning model that estimates a correlation between traveling data (explanatory variables) indicating the traveling condition of the vehicle V and the presence or absence of a passenger in the vehicle V (objective variables) using a plurality of sets of the learning dataset acquired in the step S21. As a specific method of the learning, for example, a method of executing the processes shown in the following step S23 to S26 can be adopted.

When learning of the learning model is started, first, one learning dataset to be used for learning is selected from a plurality of sets of learning datasets acquired by the learning dataset acquisition unit 74 (step S23). Then, the input data in the selected one learning dataset, that is, the traveling data, is input to the neurons of the input layer of the learning model prepared in the step S21 (step S24). When traveling data is input to the neuron of the input layer, an arbitrary value is output to the neuron of the output layer of the learning model. This output may be calculated by using a method of calculating an output value of a general neural network, that is, a method of calculating a value of an output-side neuron as a sum of a sequence of multiplication values of a value of an input-side neuron connected to the neuron and a weight value associated with a node connecting the output-side neuron and the input-side neuron to all neurons other than the neurons in the input layer.

In the above-described step S24, when the input data of the learning dataset is input to the neuron of the input layer, the type of the input data to be input to the neuron of the input layer may be appropriately set in view of the accuracy of the generated learned model or the like. For example, traveling data as input data may be input as an explanatory variable as the data acquired by the learning dataset acquisition unit 74. More specifically, the data acquired by the learning dataset acquisition unit 74 is position data obtained by positioning GPS 42 and the output signal of the acceleration sensor 46. Information on evaluation items such as sudden acceleration, sudden braking, and sudden steering may be specified from the position information determined by the output signal and GPS 42 of the acceleration sensor 46 (such processing may be referred to as "pre-processing"), and this information may be inputted to the neuron of the input layer as an explanatory variable.

When an arbitrary value is output to the neuron of the output layer of the learning model in the step S24, the learning of the learning model is executed using the output data in one learning dataset selected in the step S23, that is, the data related to the presence or absence of the passenger (step S25). In the learning, for example, the error is obtained by comparing the value output to the neuron of the output layer of the learning model in the step S24 with the information regarding the presence or absence of the passenger that constitutes the output data of the one learning dataset described above, and the weight value associated with each node is adjusted using the error back propagation method (Back Propagation) so that the obtained error becomes small.

Once the weights of the learning models are adjusted in the step S25, it is determined whether the machine learning can be terminated. If the learning is continued (No in the step S26), the process returns to the step S23, and a new learning dataset may be selected and the above-described series of steps may be repeated.

When a predetermined condition is satisfied, such as when a series of steps shown in steps S23 to S26 are repeatedly performed a predetermined number of times, or when the error becomes smaller than a preset allowable value, it is determined that machine-learning can be completed in the step S26 (Yes in step S26). In this case, as the learned model, the learning model obtained after the series of learning is stored in the learned model storage unit 80 (step S27), and the generation methods of the series of learning models are completed.

As described above, according to the machine learning device 70 and the learned model generation method according to the present embodiment, it is possible to obtain a learned model in which the correlation between the traveling data of the vehicle V and the presence or absence of the passenger in the vehicle V is learned. The learned model obtained here is used in the inference unit 68 in the passenger presence-absence detection unit 64A in the driving diagnostic device 10A of the vehicle V, so that the detection of the presence or absence of the passenger in the driving diagnostic device 10A alone can be realized.

Next, a driving diagnostic process performed by the driving diagnostic device 10A including the inference unit 68 using the learned model will be briefly described. Similar to that in the driving diagnostic device 10 according to the first embodiment, the driving diagnostic process described below may also be performed by CPU 20 executing a program stored in ROM 22 or the storage 26.

Figure 11:
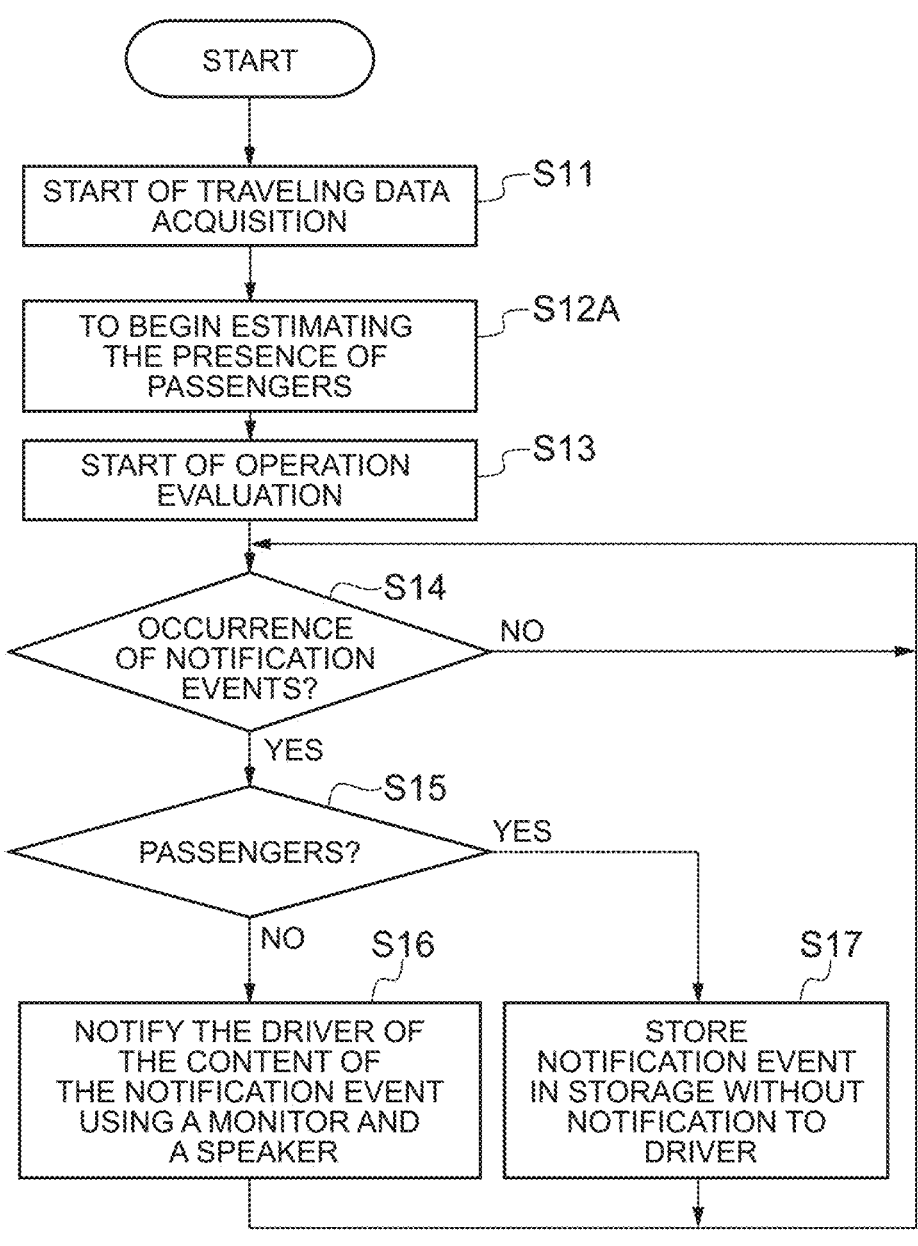
FIG. 11 is a flowchart illustrating an example of a driving diagnostic process performed by the driving diagnostic device according to the second embodiment.

FIG. 11 is a flowchart illustrating an example of a driving diagnostic process performed by the driving diagnostic device according to the second embodiment of the present disclosure. As shown in FIG. 11, the driving diagnostic process by the driving diagnostic device 10A according to the present embodiment can be the same as the process shown in FIG. 6 except that the presence or absence of the passenger is specified based on the estimation result by the inference unit 68 in the passenger presence-absence detection unit 64A. Therefore, the details of the processing steps described below are assumed to be incorporated as appropriate in the first embodiment, and the description thereof will be omitted.

Specifically, when the ride sharing service is started to be operated by the ride sharing service providing vehicle V2 by starting the driving diagnostic device 10 or the like, the traveling data is started to be acquired (step S11). Thereafter, or at the same timing as that, together with the start of the estimation of the presence or absence of the passenger by the passenger presence-absence detection unit 64A (step S12A), the start of the operation evaluation by the driving evaluation unit 62 (step S13) is made. The estimation of the presence or absence of the passenger by the passenger presence-absence detection unit 64A can be performed by inputting the traveling data acquired by the acquisition unit 60 to the input layer of the learned model in the inference unit 68.

Incidentally, in general, the passenger getting on and off the vehicle V is performed when the vehicle V is stopped for a certain period of time. Therefore, it is considered that the detection result of the presence or absence of the passenger in the vehicle V remains unchanged as long as the stop state for a certain period of time does not occur. Therefore, it is preferable to estimate the presence or absence of a passenger by the passenger presence-absence detection unit 64A every time a stop for a certain period is detected. By setting the estimation timing of the presence or absence of the passenger in this way, the traveling data for a certain long period can be secured as the traveling data input to the learned model at the time of estimation, and the estimation accuracy can be improved.

When operation of the ride sharing service providing vehicle V2 is started, the acquisition of the traveling data by the acquisition unit 60 is continuously executed, and the operation is evaluated based on the acquired traveling data. Then, when a notification event occurs (Yes in the step S14), the notification unit 66 identifies the notification of the notification event. Specifically, it is checked whether or not the estimation result by the passenger presence-absence detection unit 64A is passenger presence (step S15). When it is estimated that the passenger is not on the vehicle, the notification unit 66 performs notification to the driver in such a manner that the content of the generated notification event can be clearly understood (step S16). On the other hand, when it is estimated that the passenger is on board, the notification unit 66 does not notify the driver to avoid the notification event that has occurred from being transmitted to the passenger (step S17). Upon completion of the steps S16 and S17, the driving diagnostic device 10 returns to the step S14 to continue monitoring for new notification events.

As described above, in the driving diagnostic device 10A according to the present embodiment, the notification of the driving diagnostics according to the condition in the vehicle can be made by changing the notification methods of the driving diagnostics according to the presence or absence of the passenger. Further, as described above, if the driving diagnostic result is not transmitted to the passenger when the passenger is not on board, it is possible to improve the driving operation of the driver while suppressing the deterioration in the quality of the passenger transportation service. Further, the presence or absence of a passenger can be estimated by using the inference unit 68. Therefore, a series of driving diagnostic processing can be realized by the driving diagnostic device alone without using a signal from a component capable of directly detecting the presence or absence of a passenger mounted on the vehicle V or operation information of another application, and without requesting an input operation from the driver. This simplifies the operation of attaching and setting the driving diagnostic device 10A.

Although the learned model described in the above embodiment describes a method generated by performing learning by batch learning in the machine learning device 70, the learning timing is not limited to this. For example, online learning may be performed on the learned model generated through the above-described batch learning to further improve estimation accuracy. In this case, the traveling data acquired by the acquisition unit 60 of the driving diagnostic device on which the learned model is mounted and the data indicating the presence or absence of the passenger when the traveling data is acquired are temporarily stored in the storage 26 or the like as a set of online learning datasets. Then, the machine learning process using the online learning dataset of the learned model used in the inference unit 68 may be executed at an arbitrary timing. The data indicating the presence or absence of the passenger constituting the online learning dataset may be data that is input to the terminal device 3 by the driver or that is specified based on the operation data collected by the server 2.

Although the driving diagnostic system 1, the driving diagnostic device 10, 10A, the machine learning device 70, and the learned model generation method according to the embodiment of the present disclosure have been described above, it is needless to say that various changes can be made without departing from the gist of the present disclosure. For example, in the above-described embodiment, the rapid acceleration and the rapid braking are detected based on signals from the acceleration sensor 46 or the vehicle speed sensor 50, but the present disclosure is not limited thereto. For example, an electric signal input from an accelerator pedal and a brake pedal may be acquired, and sudden acceleration and sudden braking may be detected based on this signal.

Further, in the above embodiment, the notification is performed when the event set as the evaluation item reaches the predetermined number of warnings, but the present disclosure is not limited thereto. For example, the number of times of advance notification that is smaller than the number of times of warning may be separately set, and when the number of times of advance notification has been reached, the driver may be notified by a notification method (for example, an alert display to the monitor 52) different from the case where the number of times of warning has been reached.

Further, in the above-described embodiment, various processors other than CPU 20 may execute the notification process executed as the CPU 20 reads a program stored in the ROM 22 or in the storage 26. Examples of the processor include a Programmable Logic Device (PLD in which a circuit configuration can be changed after manufacturing of Field-Programmable Gate Array (FPGA (or the like), and a dedicated electric circuit that is a processor having a circuit configuration designed exclusively for executing a particular process such as Application Specific Integrated Circuit (ASIC (or the like). Further, the operation assessment process may be executed by one of these various processors, or may be executed by a combination of two or more processors of the same type or different types, and may be executed by a combination of a plurality of FPGA, a CPU, and a FPGA, for example. Further, the hardware configuration of these various processors may be an electric circuit in which circuit elements such as semiconductor elements are combined.

Furthermore, in the above-described embodiment, a program for driving diagnostics executed by CPU 20 is stored in advance in ROM 22 or the storage 26 in the terminal device 3, but the present disclosure is not limited thereto. For example, various types of data including programs used for driving diagnostics may be stored in a non-transitory computer-readable medium such as a recording medium separate from the terminal device 3, specifically, a magnetic disk (e.g., a HDD), an optical disk (e.g., a Compact Disk (CD) or a Digital Versatile Disk (DVD, or a flash memory (e.g., a Universal Serial Bus(USB) memory, and these data may be electrically connected to the terminal device 3 so that the program can be executed. Similarly, programs used for driving diagnostics may be provided from servers or the like via a networked NW in the form of applications.

What is claimed is:

1. A driving diagnostic device comprising:
a processor;
a plurality of sensors, wherein sensors of the plurality of sensors are selected from the group comprising a camera, a pressure sensor, and a global position system (GPS) sensor, configured to acquire traveling data indicating a traveling state of a vehicle;
a display;
a speaker; and
a memory storing instructions that, when executed by the processor, cause the processor to:
  evaluate a driving operation of a driver of the vehicle based on the traveling data acquired from the plurality of sensors, the evaluation including detecting at least one of sudden acceleration, sudden braking, sudden steering, lane deviation, or insufficient inter-vehicle distance using signals from the plurality of sensors;
  determine a presence or absence of a passenger in the vehicle by at least one of: analyzing images captured by the camera, detecting seat occupancy using the pressure sensor, or estimating passenger presence from the traveling data using a machine learning model; and
  output a driving evaluation result to the display or the speaker for the driver, such that the evaluation result is suppressed or modified to prevent transmission to the passenger when the presence of the passenger is determined,
  wherein the evaluation of the driving operation of the driver is based on a number of times that the traveling data corresponds to conditions of a plurality of evaluation items related to a preset driving operation, the evaluation of the driving operation of the driver is performed using a first evaluation item group used when the absence of the passenger is determined and a second evaluation item group when the presence of the passenger is determined, and the second evaluation item group is different from the first evaluation item group.

2. The driving diagnostic device according to claim 1, wherein the instructions, when executed by the processor, cause the processor to avoid outputting the driving evaluation result when the presence of the passenger is determined.

3. The driving diagnostic device according to claim 1, wherein:
the instructions, when executed by the processor, cause the processor to:
  determine the presence or absence of the passenger from the traveling data; and
  output a result of the presence or absence of the passenger using the machine learning model.

4. A driving diagnostic system provided with a server and a terminal device installed in a vehicle, the server and the terminal device being connected so as to be communicable with each other via a network, the driving diagnostic system comprising:
a processor;
a plurality of sensors, wherein sensors of the plurality of sensors are selected from the group consisting of a camera, a pressure sensor, and a global position system (GPS) sensor, configured to acquire traveling data indicating a traveling state of the vehicle;
a display;
a speaker; and
a memory storing instructions that, when executed by the processor, cause the processor to:
  evaluate a driving operation of a driver of the vehicle based on the traveling data acquired from the plurality of sensors, the evaluation including detecting at least one of sudden acceleration, sudden braking, sudden steering, lane deviation, or insufficient inter-vehicle distance using signals from the plurality of sensors;
  determine a presence or absence of a passenger in the vehicle by at least one of: analyzing images captured by the camera, detecting seat occupancy using the pressure sensor, or estimating passenger presence from the traveling data using a machine learning model; and
provided in output using the terminal device a driving evaluation result to the display or the speaker for the driver, such that the evaluation result is suppressed or modified to prevent transmission to the passenger when the presence of the passenger is determined,
  wherein the evaluation of the driving operation of the driver is based on a number of times that the traveling data corresponds to conditions of a plurality of evaluation items related to a preset driving operation, the evaluation of the driving operation of the driver is performed using a first evaluation item group used when the absence of the passenger is determined and a second evaluation item group when the presence of the passenger is determined, and the second evaluation item group is different from the first evaluation item group.

5. A machine learning device for acquiring a learned model to be used in the driving diagnostic device according to claim 3, the instructions, when executed by the processor, cause the processor to:
acquire two or more learning datasets, each of which is composed of input data including the traveling data indicating the traveling state of the vehicle and output data including data indicating the presence or absence of the passenger in the vehicle; and learn the learning model for estimating a correlation between the input data and the output data using the acquired two or more learning datasets.

6. A generation method of a learned model to be used in the driving diagnostic device according to claim 3, the instructions, when executed by the processor, cause the processor to:

acquire two or more learning datasets, each of which is composed of input data including the traveling data indicating the traveling state of the vehicle and output data including data indicating the presence or absence of the passenger in the vehicle; and learn the learning model for estimating a correlation between the input data and the output data using the two or more learning datasets.

7. The driving diagnostic device according to claim 1, wherein the processor is configured to evaluate the driving operation of the driver of the vehicle based on the traveling data acquired from the plurality of sensors further including at least one of an acceleration sensor, a steering angle sensor, or a vehicle speed sensor.

8. The driving diagnostic device according to claim 1, wherein the processor is configured to cause the memory to temporarily store the driving evaluation result when the presence of the passenger is determined, wherein the memory is an in-vehicle memory.

9. The driving diagnostic device according to claim 8, wherein the processor is configured to output the driving evaluation result to the driver in response to changing from a determination of the presence of the passenger to a determination of the absence of the passenger.

* * * * *